United States Patent [19]

Stockel

[11] Patent Number: 4,469,503

[45] Date of Patent: Sep. 4, 1984

[54] COAL ASH FERTILIZER COMPOSITIONS

[76] Inventor: Richard F. Stockel, 475 Rolling Hills Rd., Bridgewater, N.J. 08807

[21] Appl. No.: 481,647

[22] Filed: Apr. 4, 1983

Related U.S. Application Data

[63] Continuation-in-part of Ser. No. 54,710, Jul. 5, 1979, abandoned.

[51] Int. Cl.$^3$ .............................................. C05F 11/02
[52] U.S. Cl. ........................................... 71/24; 71/28; 71/29
[58] Field of Search ............... 106/DIG. 1; 71/24, 25, 71/27, 28–30, 49, 61, 63

[56] References Cited

U.S. PATENT DOCUMENTS

| | | | |
|---|---|---|---|
| 4,067,716 | 1/1978 | Sterrett | 71/25 X |
| 4,252,919 | 2/1981 | Wagner et al. | 71/27 X |
| 4,352,856 | 10/1982 | Smillie | 106/DIG. 1 |

Primary Examiner—Ferris H. Lander
Attorney, Agent, or Firm—Sheldon H. Parker

[57] ABSTRACT

The invention relates to a fertilizer composition which comprises coal ash, and a relatively water insoluble polymer capable of gradually decomposing to slowly release nitrogen polymerized uniformly on said coal ash. The polymer is formed by the in situ polymerization of an aldehyde and a polymerizable organic nitrogen containing compound capable of reacting with two or more equivalents of said aldehyde in the presence of an acid. The coal can be fly ash, bottom ash or boiler slag and can be derived from anthracite, bituminous or subbituminous coal or from lignite coal. The acid can be phosphoric acid, the aldehyde formaldehyde and the polymerizable organic nitrogen containing compound urea.

27 Claims, No Drawings

COAL ASH FERTILIZER COMPOSITIONS

This application is a continuation-in-part of Ser. No. 54,710, filed July 5, 1979 and now abondoned.

BACKGROUND OF THE INVENTION

1. Field of the Invention

This invention concerns novel, unique and useful coal ash fertilizer compositions and a method for manufacturing of such compositions. It has been found that by performing certain chemical reactions that particulate coal residue can be converted into valuable fertilizers. Depending on the specific reactions involved, the coal residue can be made into a slow acting fertilizer or a fast acting fertilizer and/or a combination of the two. In addition to having present, after chemical modification, the major elements needed for growth of plants, for example, nitrogen, phosphorous and potassium, coal ash itself has present in it many of the minor and micro nutrients needed for effective plant growth.

Coal is the most widely distributed fuel in the United States and is found in 38 states. The nation's total coal reserves have been estimated at about 4 trillion tons, nearly half of which is thought to be recoverable reserves. The coal from the wide range of locations across the country include fuels varying significantly with respect to heat content, ash content and chemical properties. Coal combustion results in a residue consisting of the inorganic mineral constituents in the coal and some organic matter which is not wholly burned. The inorganic mineral constituents, whose residue is ash, make up from 3 to 30 percent of the coal. During combustion, this ash is distributed into two parts, bottom ash collected from the bottom of the boiler unit, and fly ash, most of which is collected by air pollution control equipment. The distribution of ash between the bottom and fly ash fraction is a function of the boiler type, coal type, and whether or not a wet or dry bottom furnace is utilized. Fly ash makes up from 10% to 85% of the coal ash residue and occurs as spherical particles, usually ranging in diameter from 0.5 to 100 microns. The bottom ash, composed primarily of coarser, heavier particles than the fly ash, ranges from gray to black in color and is generally angular with a porous surface. If it is collected as a slag, these slag particles generally are black, angular and have a glass-like appearance.

Petrographic analysis has shown that glass is the primary component of ash. Other components of the ash include magnetite, hematite, carbon, mullite, and quartz. The major chemical constituents of ash are primarily silica, alumina, iron oxide, and calcium oxide. Minor elements present include magnesium, titanium, sodium, potassium, sulfur and phosphorus. They comprise from 0.5% to 3.5% by weight of the ash. Ash also contains trace concentrations of from 20 to 50 different elements including antimony, arsenic, barium, beryllium, boron, copper, fluorine, lead, manganese, mercury, molybdenum, nickel, selenium, tellurium, thallium, tin, uranium, vanadium, cobalt and zinc.

If you compare this list of elements found in coal ash residues to the list of elements required for plant nutrition, you find considerable overlap. Carbon, hydrogen, oxygen, nitrogen, phosphorus, and sulfur are the elements of which proteins, hence, protoplasm, are composed. In addition to these six, there are fourteen other elements which are essential to the growth of some plant or plants; calcium, magnesium, potassium, iron, manganese, molybdenum, copper, boron, zinc, chlorine, sodium, cobalt, vanadium and silicone. While all are not required for all plants, all have been found to be essential to some. These mineral elements, in addition to phosphorus and sulfur, usually constitute what is known as the plant ash, or the minerals remaining after the burning off of carbon, hydrogen, oxygen and nitrogen. Each of the 20 elements play a role in the growth and development of plants, and when present in insufficient quantities, can reduce growth and yields.

When comparing the elements of coal ash residues and the required elements for plant growth, it is amazing to find that only sufficient quantities of nitrogen, phosphorus and chlorine are not available in fly ash residues and perhaps sufficient potassium depending on the origin of the coal ash. Considering the great diversity of elements found in nature, overlap between coal ash residues and what is required for effective growth of plants is remarkable. By suitable chemical modifications to introduce larger quantities of nitrogen and phosphorus and small amounts of chlorine, if required, these chemically modified coal ash residues will make excellent fertilizers at very low cost because unlike commerical fertilizers, they contain all the necessary elements for plant growth.

Tables I and II show the variation in coal ash composition with coal rank and the chemical characteristics of fly ash and bottom ash from the particular coal region in the United States.

TABLE I

VARIATION IN COAL ASH COMPOSITION WITH COAL RANK

| Chemical Constituent | Coal Rank, Percent | | | |
|---|---|---|---|---|
| | Anthracite | Bituminous | Subbituminous | Lignite |
| $SiO_2$ | 48–68 | 7–68 | 17–58 | 6–40 |
| $Al_2O_3$ | 25–44 | 4–39 | 4–35 | 4–26 |
| $Fe_2O_3$ | 2–10 | 2–44 | 3–19 | 1–34 |
| $TiO_2$ | 1.0–2.0 | 0.5–4 | 0.6–2 | 0.0–0.8 |
| CaO | 0.2–4 | 0.7–36 | 2.2–52 | 12.4–52 |
| MgO | 0.2–1 | 0.1–4 | 0.5–8 | 2.8–4 |
| $Na_2O$ | — | 0.2–4 | — | 0.2–28 |
| $K_2O$ | — | 0.2–4 | — | 0.1–1.3 |
| $SO_3$ | 0.1–1 | 0.1–32 | 3.0–16 | 8.3–32 |

TABLE II

TRACE ELEMENTS IN COAL AND COAL ASH FROM DEPOSITS AROUND THE WORLD

| Element | Coal (ppm) | Ash (ppm) |
|---|---|---|
| Antimony | 10–30 | 100–3,000 |
| Arsenic | 0.8–500 | 280–10,000 |
| Barium | 2–257 | 18–2,200 |
| Beryllium | <0.1–40 | 1–4,000 |
| Bismuth | 0–100 | 0–2,000 |
| Boron | 15–356 | 52–10,000 |
| Chlorine | 30–560 | |
| Chromium | <0.1–50 | <0.1–7,400 |
| Cobalt | <0.4–34 | <5–2,000 |
| Copper | 2.6–185 | 10–1,200 |
| Fluorine | 40–480 | |
| Gallium | <1.4–100 | 10–3,200 |
| Germanium | <0.4–50 | 9–47,000 |
| Iodine | 1.11 | |
| Lanthanum | <1.5–40 | <30–700 |
| Lead | 25–3,000 | 200–31,000 |
| Manganese | 9–>5,000 | 100–22,000 |
| Mercury | 0.001–300 | |
| Molybdenum | <0.7–200 | <5–6,000 |
| Nickel | 0.42–>60 | <5–16,000 |
| Palladium | | 0.2 |
| Platinum | | 0.7 |
| Rhodium | | 0.02 |

TABLE II-continued

TRACE ELEMENTS IN COAL AND COAL ASH FROM DEPOSITS AROUND THE WORLD

| Element | Coal (ppm) | Ash (ppm) |
| --- | --- | --- |
| Silver | 0–3 | 0–60 |
| Strontium | 0–100 | 0–>1,000 |
| Scandium | | 60–400 |
| Tin | <0.1–300 | 0.4–6,000 |
| Titanium | 95–2.320 | 100–35,000 |
| Uranium | 0–24,000 | 6–1,650 |
| Vanadium | <1.4–>100 | <10–25,000 |
| Yitrium | <0.1–49 | <10–2,000 |
| Zinc | 7.6–2,000 | 115–21,000 |
| Zirconium | 0–140 | 0–7,000 |

It should be recognized that the diversity of the chemical composition of coal ash varies from region to region, therefore, depending on the origin of the coal, different chemical reactions should be carried out to obtain an efficient fertilizer.

To achieve an effective fertilizer, it is necessary to transform some of the elements found in coal ash residues into a desirable chemical moieties. The major elements of a fertilizer are nitrogen, phosphorus and potassium. The known types of nitrogen containing fertilizers are the following: ammonium sulfate, anhydrous ammonia, ammonium chloride, ammonium nitrate, ammonium nitrate with lime, ammoniated superphosphate, monoammonium phosphate, diammonium phosphate, ammonium phosphate-sulfate, calcium nitrate, calcium cyanamide, potassium nitrate, sodium nitrate, urea, urea-sulfur, urea-phosphate, sulfur coated urea, urea-formaldehyde, metal ammonium phosphates, for example, magnesium ammonium phosphate, oxamide, crotonylidene diurea, isobutylidene diurea, dicyanadiamide and thiourea. The second major element is phosphorus. There are two types of phosphorus, an organic type and an inorganic type. The organic types are: phospholipids, nucleic acids, and inositol phosphates; inorganic types are collectively called orthophosphates; these are phosphoric acid, superphosphoric acid, calcium orthophosphates, ammonium phosphates, nitric phosphates, potassium phosphates, dicalcium phosphates and calcium metaphosphates and the so called polyphosphates.

With respect to the third major elements, potassium, you can have potassium, which is slowly available, and these include potassium tied up with various clay soils, or you can have water soluble potassium compounds present as potassium halides, nitrates, sulfates or double salts containing potassium compounds. These and other type fertilizers containing the major elements required for plant growth are detailed in a textbook entitled "Soil, Fertility and Fertilizers", Third edition, by Samual L. Tisdale and Werner L. Nelson, published by MacMillen Publishing Co., Inc., New York 1975. This reference is hereby incorporated into the body of this invention.

In order to have a better understanding of this invention, it is important to understand how each of the major nutrient elements for plants functions. Nitrogen is absorbed by plants primarily in the form of nitrates, although smaller amounts of the ammonium ion and urea can also be absorbed. An adequate supply of nitrogen is associated with vigorous vegetable growth and a deep green color. When plants are deficient in nitrogen, they become stunted and yellow in appearance. Phosphorus is generally absorbed as the primary orthophosphate ($H_2PO_4^{-1}$) and smaller amounts of the secondary orthophosphate ($HPO_4^{-2}$). Other forms of phosphorus can be assimilated into a plant, among which are pyrophosphates and metaphosphates. They are absorbed by plant roots. These latter materials are polyphosphates hydrolyzed slowly. Phosphorus is associated with increased root growth and hastens plant maturity. Potassium is generally absorbed as the potassium ion. The requirement for potassium in plants is quite high. Potassium deficiencies greatly reduce crop yields and decrease the resistance to certain plant diseases. Photosynthesis is decreased, thus carbohydrates are less available. Calcium is also required by high plants and it is absorbed principally as the calcium ion. Deficiency results in failure of the terminal buds of the plants to develop. Magnesium is responsible for the production of chlorophyll. The chlorophyll molecule contains a coordinated magnesium ion needed for photosynthesis. Sulfur is absorbed by plant roots as the sulfate ion, it is almost exclusively reduced to disulfide and the mercapto group. The deficiency of sulfur has a pronounced retarding effect on plant growth. Boron is generally absorbed in the ionic oxygenated form, while iron is utilized from complex organic materials. The other micro-nutrients requirements are not well studied and consequently will not be discussed.

DESCRIPTION OF THE PREFERRED EMBODIMENT

It has been found that functional fertilizers derived from coal ash residues can be classified into two types. The first type is where various nitrogen, phosphorus, and sulfur organic and inorganic compounds are simply added to the coal ash, thus these fertilizers can be considered admixtures. Secondly, various compounds, either inorganic or organic can be made to react with certain chemical constituents in coal ash to form products which are very effective fertilizers. Some examples of nitrogen containing compounds which are fertilizers that yield very quick available nutrients are ammonium nitrate, ammonium nitrate with lime, ammonium nitrate-sulfate which is a double salt, ammonium sulfate, ammonium dihydrogen phosphate, diammonium monohydrogen phosphate, ammonium chloride, urea, a urea sulfur compound, a urea phosphate compound or any of the soluble nitrates and nitrites. Slowly available nitrogen compounds are sulfur coated urea, urea carbonyl compounds where the latter is formaldehyde or other aldehydes, metal ammonium phosphates such as magnesium ammonium phosphate, oxamide or calcium cyanamide or thiourea of dicyanamide. The nitrogen compounds which will form salts with the various cations which are readily available in coal ash, such as calcium, magnesium, sodium and potassium and aluminum are Bronsted and/or Lewis acids. Some examples are sulfamic, amidosulfonic, imidosulfonic, nitrilosulfonic, hyponitrous, nitrous and nitric acids. Many other nitrogen containing Bronsted and/or Lewis acids are also useful.

With respect to phosphorus plant nutrients, the various ortho phosphates such as calcium, ammonium, potassium, etc., can be added directly to increase the content of phosphorus, or phosphoric acid or superphosphoric acid can be added to the coal ash residue which will react with the cations available, the major one of which is calcium. Thus calcium oxide would react with phosphoric acid to form the various calcium orthophosphates. Thermal treatment of this reaction mixture would form the metaphosphates, pyrophosphates and polyphosphates depending on the actual reaction conditions.

With respect to potassium, many coal ash residues contain up to 4% potassium expressed as potassium oxide. If additional potassium is needed any of the soluble potassium salts could be added. Various potassium soluble inorganic compounds are listed in Lange's Handbook of Chemistry, eleventh edition, edited by John A. Dean, McGraw Hill Co., New York, 1973. Thus, these compounds are included as part of this invention. Various organic type potassium compounds could also be added, such as potassium derivitives of various polyfunctional carboxylic acids. Once the basic requirements of nitrogen, phosphorus and potassium are satisfied by simple addition of compounds as an admixture, inorganic or organic and/or the addition of compounds containing these elements which react with the coal ash, it will be noticed that the remaining major and minor nutrients are already present.

These novel fertilizers comprising chemically modified coal ash residues represent a major economic improvement with respect to the presence of virtually every type of nutrient that a plant needs for growth. Of course, the final fertilizer composition, as mentioned previously will depend on whether the coal ash is derived from anthracite, bituminous, subbituminous or lignite. Thus, if the high sulfur-potassium fertilizer is required and you do not wish, or it is not economically desirable, to add compounds containing these elements, then the bituminous and lignite type of coal ashes are preferred (See Table I). The same is true if one wishes to have a final fertilizer composition that is high in calcium orthophosphate; then here too, the bituminous, subbituminous or lignite coal ash residue is preferred over the anthracite by the addition of a phosphorus containing Bronsted or Lewis acid. In general then, anthracite coal ashes are the least preferred because they have the least content of potassium or sulfur containing residues.

In the following examples, no minor or micro nutrients were added because they were present in sufficient quantities in the coal ash samples which were utilized. Therefore, only nitrogen, phosphorus, and in a few cases potassium, were added to produce a suitable fertilizer. The presence of the major constituents of coal ash residues which are silica and alumina, are particularly effective carrier materials which are commonly found in commercial grade fertilizers. In addition, these materials give a loose type soil where ample aeration and excellent water drainage can occur, thus speeding up the growth of the plant. The chemically modified coal ash residue fertilizers are particularly good for horticultural use in nurseries where high cash value crops are grown and where ornamental plants and trees are grown, as well as being effective for farm crops, such as corn, wheat, soybean, sorghum, alfalfa, etc.

EXAMPLE 1

To 10 lbs. of an anthracite coal ash residue analyzed to contain 2% calcium oxide and 0.5% alkali oxide was added 85% phosphoric acid so that the final product contained approximately 6% phosphorus. To this slurry was added urea and formaldehyde in a ration of 1.5 to 1 with a minimum amount of water to form a workable mixture. The urea and formaldehyde under these acid conditions condensed to form a urea formaldehyde slow release type formulation. The amount of available nitrogen was analyzed to contain approximately 10% by weight. In this example, it was not necessary to remove the excess water since the bottom ash particles retained their integrity. This chemically modified coal ash residue from an anthracite coal also contained about a ½% sulfur expressed as sulfur trioxide, approximately 4.2% ferric oxide, virtually no potassium oxide and reamining composition being silica dioxide and alumina with some titanium dioxide present. It also contains all of the micro nutrients in parts per million and in some cases, 10 to 50 thousand parts per million.

EXAMPLE 2

To 10 pounds of a bottom ash derived from bituminous coal was added diammonium monohydrogen orthophosphate. This salt has 20% available nitrogen and 54% available phosphorus pentaoxide by weight. Its water solubility at approximately 10 degrees centigrade is 57 grams per 100 milimeters of water. A saturated solution of the salt was added to the bottom ash such that the total amount of nitrogen and phosphorus was approximately 12% nitrogen and approximately 30% phosphorus pentaoxide by weight. The bituminously derived bottom ash also contained 3% potassium oxide, about 7% sulfur as sulfur trioxide and 17% calcium oxide in addition to the presence of all of the micro nutrients required for plant growth.

EXAMPLE 3

To 10 pounds of a lignite derived bottom ash containing 40% calcium oxide and about 10% sulfur expressed as sulfur trioxide was treated with a saturated solution of potassium nitrate commonly known as saltpeter, which has a water solubility at 30 degrees centigrade of 32 grams per hundred milimeters of water. In addition, a 85% orthophosphoric acid solution was added. The final chemically modified coal ash material contained approximately 7% nutrogen, approximately 28% potassium oxide and about 25% phosphorous pentaoxide, as well as sufficient quantity of calcium, sulfur and the micro nutrients.

EXAMPLE 4

To 10 pounds of fly ash residue derived from an anthracite coal was added in equal parts, monoammonium dihydrogen phosphate, which contains 11% available nitrogen and 48% available phosphorus pentaoxide by weight and dipotassium monyhydrogen phosphate which contains approximately 9% phosphorus pentaoxide, 45% potassium by weight. These were added as saturated aqueous solutions. The resulting fly ash contained approximately 4% available nitrogen, 20% available phosphorus pentaoxide and 21% available potassium. The fly ash was then pelletized using potassium silicate.

EXAMPLE 5

To 10 pounds of a bottom ash residue derived from a lignite type coal containing 45% calcium oxide was treated with diammonium hydrogen phosphate containing 20% available nitrogen and 54% available phosphorus pentaoxide by weight. The resulting fertilizer, which had approximately 5% available nitrogen and 10% available phosphorus pentaoxide, was particularly good as a liming material for acidic soils. In addition, it also had the availability of all of the micro nutrients required for plant growth.

EXAMPLE 6

Using the bottom ash material treated with urea, formaldehyde and phosphoric acid, as described in Example 1, was added tetraboric acid and potassium chloride, such that the resulting fertilizer is chemically treated coal ash fertilizer contained these important minor elements at at approximately 1% by weight level. In cases where size enlargement, for example where fly ash is utilized or size reduction where certain bottom ashes might be of too large a size for practical use, methods for achieving proper size particles can be found in the Chemical Engineering Handbook, fifth edition, by Robert H. Perry and Cecil H. Chilton, published by McGraw Hill Book Co., New York, 1973, Section E. Therefore, these methods are also incorporated into the body of this invention.

The value of using coal ash as the matrix for a fertilizer lies in part in the fact that coal ash consists primarily of silica and alumina similar to the common materials and synthetic clays used as fertilizer carriers. Coal ash is inert, gives bulk to the soil which allows water and air to freely circulate to the roots of the plant. The coal ash is alkaline due to the presence of calcium and magnesium oxides. Since most soils are acidic, the application of a coal ash carried fertilizer helps solve the acidity problem by partial or total neutralization of the acidity. The coal ash further provides the micro-nutrients required for plant growth. Thus, coal ash matrix fertilizer is a complete product, unlike clay matrix fertilizers.

Typical clays which are used as carriers in fertilizers have been found to exhibit ion exchange properties. Such a clay could have a cation exchange capacity in the range from a low of 3 to a high of 150, expressed in milliequivalents per hundred grams. The anion exchange capacity can range from a low of about 4 to a high of about 23. By way of contrast, this undesirable property is substantially absent in coal ash. That is to say that the cation and anion values would be substantially 0.

All natural clays develop plasticity when mixed with water therefore tending to lump or agglomerate. Granular coal ash residues do not possess this characteristic thus being relatively free of lumping or agglomeration and resulting in a more efficient fertilizer carrier.

As previously set forth herein, the urea and formaldehyde are polymerized on the coal ash carrier in order to produce a low solubility polymer and consequently a slow release fertilizer.

By way of example when eight and one half pounds of phosphoric acid (on a 100% solids basis) is added to ten pounds of an anthracite coal coal ash, in combination with the minimum amount of water which is sufficient to produce a slurry, as well known in the art, and then mixed with a desired quantity of urea and formaldehyde in at least about a one and one half to one ratio and preferably in a two to one ratio mole equivalent basis, and caused to polymerize, as well known in the art, an essentially water insoluble, gradual decomposition polymer is produced on the coal ash. The resultant product is a high content source of macro and micro nutrients.

It is noted that ratio of coal ash to ureaformaldehyde is not narrowly critical and can be tailored to suit soil and plant requirements in a particular region. Similarly, regional customization requirements can be by proper selection of the type of coal ash selected.

Accordingly, a suitable product can be produced from ten pounds of anthracte coal ash, 4.7 pounds of urea and three and one half pounds of formaldehyde. The acid can be, or include hydrochloric or nitric acid depending upon the desired composition of the final product.

The polymerization in situ, of the urea and formaldehyde on the coal ash carrier creates a low solubility barrier between the micro-nutrient containing coal ash and the soil. Consequently, the rate of release of the micro-nutrients is both decreased and correlated with the rate of release of the macronutrients.

It is thus evident that the coal ash-fertilizer system of the instant invention is functionally superior to a mixture of coal ash and conventional fertilizer as well as clay-fertilizer systems.

Since the coal ash functions both as a source of micro-nutrients and alkalinity and as a macro-nutrient carrier an economic advantage is realized as compared to the combination of a clay carrier-macro-nutrient system and coal ash or other source of micro-nutrients and alkalinity.

A further economic advantage of coal ash over clay as a fertilizer carrier is realized because of the wide spread distribution of available coal ash. For example, on the order of 600 power plant across the country produce coal ash as a waste product from the burning of coal. At present it is common for the power plants to pay for the disposal of this waste material. The productive use of this material converts a waste product which presents a disposal problem into a commercially valuable product located within reasonable distances from its ultimate region of use. Again a contrast is seen with clay which must be shipped predominantly from the southern parts of the United States to its ultimate regions of use and is not a commodity which currently has a negative value.

Another advantage in using coal ash as a fertilizer, is based on its positive contribution to the economics of burning coal by virtue of converting a waste disposal problem into an asset.

It is thus evident that the use of coal ash as a micro-nutrient source and macro-nutrient carrier provides both functional and economic advantages over conventional fertilizer systems.

What is claimed is:

1. The method of preparing a fertilizer comprising the steps of:
    (a) mixing water,
        coal ash,
        aldehyde,
        acid, and
    polymerizable organic nitrogen containing compound capable of reacting with at least on and one half mole equivalents of said aldehyde in the presence of said acid to form a relatively water insoluble polymer capable of gradually decomposing to slowly release nitrogen,
    (b) polymerizing in-situ, said aldehyde and said polymerizable organic nitrogen containing compound to form said relatively water insoluble polymer capable of gradually decomposing to slowly release nitrogen uniformly distributed on said coal ash, said coal ash functioning as a carrier for said polymer and as a source of micro-nutrients.

2. The method of claim 1, wherein said coal ash is fly ash.

3. The method of claim 1, wherein said coal ash is bottom ash.

4. The method of claim 1, wherein said coal ash is boiler slag.

5. The method of claim 1, wherein said coal ash is derived from anthracite coal.

6. The method of claim 1, wherein said coal ash is derived from bituminous coal.

7. The method of claim 1, wherein said coal ash is derived from subbituminous coal.

8. The method of claim 1, wherein said coal ash is derived from lignite coal.

9. The method of claim 1, wherein said fertilizer composition contains up to 40% nitrogen, up to 25% potassium expressed as potassium oxide and up to 60% phosphorus.

10. The method of claim 1, wherein said acid is phosphoric acid.

11. the method of claim 1, wherein said aldehyde is formaldehyde.

12. The method of claim 11, wherein said formaldehyde and is reacted with at least about two mole equivalents of said polymerizable organic nitrogen containing compound.

13. The method of claim 1, wherein said polymerizable organic nitrogen containing compound is urea.

14. The method of claim 13, wherein said aldehyde is reacted with at least about two mole equivalents of said urea.

15. A fertilizer composition comprising:
(a) coal ash, and
(b) a relatively water insoluble polymer capable of gradually decomposing to slowly release nitrogen polymerized uniformly on said coal ash by the in situ polymerization of aldehyde and polymerizable organic nitrogen containing compound capable of reacting with two or more equivalents of said aldehyde in the presence of an acid.

16. The fertilizer of claim 15, wherein said coal ash is fly ash.

17. The fertilizer of claim 15, wherein said coal ash is bottom ash.

18. The fertilizer of claim 15, wherein said coal ash is boiler slag.

19. The fertilizer of claim 15, wherein said coal ash is derived from anthracite coal.

20. The fertilizer of claim 15, wherein said coal ash is derived from bituminous coal.

21. The fertilizer of claim 15, wherein said coal ash is derived from subbituminous coal.

22. The fertilizer of claim 15, wherein said coal ash is derived from lignite coal.

23. The fertilizer of claim 15, wherein said fertilizer composition contains up to 40% nitrogen, up to 25% potassium expressed as potassium oxide and up to 60% phosphorus.

24. The fertilizer of claim 15, wherein said acid is phosphoric acid.

25. The fertilizer of claim 15, wherein said aldehyde is formaldehyde.

26. The fertilizer of claim 15, wherein said polymerizable organic nitrogen containing compound is urea.

27. The fertilizer of claim 15, wherein said aldehyde is reacted with at least about two mole equivalents of said urea.

* * * * *